United States Patent [19]

Burton et al.

[11] 4,140,566
[45] Feb. 20, 1979

[54] REINFORCED SHEET-TYPE WALLCOVERING

[75] Inventors: Arthur Burton, Tameside; Roy Conway, Dukinfield, both of England

[73] Assignee: Imperial Chemical Industries Limited, London, England

[21] Appl. No.: 777,424

[22] Filed: Mar. 14, 1977

[30] Foreign Application Priority Data

Mar. 30, 1976 [GB] United Kingdom ............... 12737/76

[51] Int. Cl.$^2$ ......................... B41D 7/00; B32B 23/08
[52] U.S. Cl. .................................. 156/219; 156/220; 156/196; 156/277; 156/209; 428/359; 428/360; 428/514; 428/412; 428/425; 428/474; 428/480; 156/322
[58] Field of Search ...................... 156/219, 220, 209; 428/514, 359, 360

[56] References Cited

U.S. PATENT DOCUMENTS

| | | | |
|---|---|---|---|
| 2,464,301 | 3/1949 | Francis, Jr. | 428/280 |
| 3,196,062 | 7/1965 | Kristal | 156/209 X |
| 3,560,322 | 2/1971 | Magid | 156/209 X |
| 3,956,541 | 5/1976 | Pringle | 428/2 |

*Primary Examiner*—P. C. Ives
*Attorney, Agent, or Firm*—Cushman, Darby & Cushman

[57] ABSTRACT

Production of a wall or ceiling covering comprising an embossed laminate of a first printable embossable ply, and a second supporting ply. The first ply consists of a paper sheet containing 60–100% by weight of cellulose wood pulp fibers and 0–40% discontinuous fibers of a synthetic thermo-plastic polymeric material. The second ply consists of a sheet of 10–60% cellulosic wood pulp fibers, and 40–90% of thermoplastic fibers (either the same as or different than those in the first ply). A fused three dimensional network is formed by heating the laminate to a temperature at which the thermoplastic fibers are rendered plastic.

2 Claims, No Drawings

REINFORCED SHEET-TYPE WALLCOVERING

This invention relates to a sheet-type wallcovering or ceiling covering and to a method for producing such a wallcovering or ceiling covering.

According to the present invention we provide a method of producing a wall- or ceiling- covering comprising laminating a first ply consisting of a paper sheet containing from 60 to 100% by weight of cellulose fibres and from 0 to 40% by weight of discontinuous fibres of a synthetic thermoplastic polymeric material and another ply comprising a sheet containing from 10 to 60% by weight of cellulosic fibres and from 40 to 90% by weight of discontinuous fibres of the same or a different synthetic thermoplastic polymeric material and heating the laminate to a temperature at which the fibres are rendered plastic and fuse together to form a three dimensional network and either simultaneously or subsequently embossing the hot laminate.

We also provide a novel wallcovering or ceiling covering produced by the aforementioned method.

In the wallcovering, the paper sheet provides, what is known in the art as, the decorative surface of the wallcovering and the other sheet provides, what is known in the art as, the working surface of the wallcovering. Though we have said that the paper sheet provides the decorative surface of the wallcovering it should be understood that the surface of the paper sheet may be provided with a coating of a plastics material, such as polyvinyl chloride, in which case the coating rather than the paper sheet will constitute the decorative surface of the wallcovering.

Such a wallcovering has a number of advantages over conventional wallcoverings. Because its working surface has such a high synthetic fibre content, the wallcovering is dry-strippable from the wall. Also as the wallcovering contains synthetic fibres then the wallcovering is more easily embossed and exhibits improved emboss retention compared with conventional wallpaper bases. Furthermore when the paper sheet is provided with a coating of, for example, polyvinyl chloride we have found that wallcoverings having a very deep emboss can be produced at much lower cost than conventional wallcoverings based on polyvinyl chloride coated paper.

The paper sheet may be made by a conventional paper making technique from a cellulose pulp and optionally fibres of a synthetic thermoplastic polymeric material. The cellulose pulp used may be either a chemical, semi-chemical or mechanical pulp. It is preferred, however, that the cellulose pulp is a chemical pulp. We also prefer that the paper sheet has been produced from a mixture containing from 85 to 95% of cellulose wood pulp and from 5 to 15% of discontinuous fibres of a synthetic thermo-plastic polymeric material (i.e. a synthetic wood pulp), the percentages being expressed as the weight of dry material (wdm).

The other sheet may be made by a conventional paper-making technique and preferably is produced from pulp comprising a mixture of from 40 to 60% by weight of cellulosic wood pulp fibres (wdm) and from 40 to 60% by weight of discontinuous synthetic pulp fibres (wdm) of a synthetic thermoplastic polymeric material. When making the sheet, it is preferable to incorporate the cellulose pulp in a suspension of the discontinuous synthetic pulp fibres and then to subject the mixture to a refining and possibly pulp dispersion process in any equipment which can ensure intimate mixing of the components. Preferably a wide angle cone refiner or a perforated or toothed disc refiner is used. Finally the sheet is formed by conventional paper-making methods.

Discontinous fibres of a synthetic thermoplastic polymeric material are understood to mean fibrous structures of a synthetic thermoplastic polymeric material comprising very thin filaments of a micron order thickness and having a length less than 20 mm, and preferably less than 5 mm, which, after the sheet has been heated to a temperature at which the fibres are rendered plastic, fuse together to form a three dimensional network in the sheet.

The fibres used may be selected from the group consisting of polyolefines, polyamides, polyesters, polyurethanes, polycarbonates, vinyl and acrylic resins. Mixtures of two or more of such fibres may be used in either ply. Furthermore, and particularly in the ply constituting the working surface of the wallcovering, other non-thermoplastic or thermoplastic staple fibres may be used in admixture with the thermoplastic fibres. Preferred fibres are fibres of a polymer obtained from an alpha-olefin containing from 2 to 6 carbon atoms. In particular we find that excellent results are achieved with fibres of polyethylene and/or polypropylene.

The pulps used to produce both plies in the laminate may also contain other usual additives such as binders, pigments and fillers.

The two plies constituting the laminate may be laminated together by any suitable method. Conveniently a suitable adhesive is applied to one or both plies by a conventional spreading method for example air knife coating, knife over blanket, knife over roller, two roll, spray heads, reverse roll coater and lamination achieved by passing the superimposed plies through the nip between two light pressure rollers. The adhesive is subsequently dried by passing the laminate through an oven.

The paper sheet because it contains either no synthetic fibres or a low proportion of synthetic fibres will be receptive to the usual wallpaper printing inks and so can conveniently be printed using conventional techniques. The paper sheet can be printed either before or after it has been laminated to the other ply. Furthermore the laminate after it has been heated to a temperature at which the fibres are rendered plastic can be provided with a deep embossed design by embossing the still-hot laminate. Though the laminate may be simultaneously heated and embossed by means of a hot embossing roller we prefer to heat the laminate prior to embossing.

The invention will now be described with reference to the following Example:

EXAMPLE

A wallcovering according to the invention was produced as follows:

A paper sheet having a weight of 60 gsm and containing 10% by weight of polyethylene fibres having a length in the range 0.8 to 2.0 mm was provided with a continuous coating of an aqueous adhesive based on starch by a spray technique.

On the adhesive coated paper sheet was superimposed a sheet containing 50% by weight of cellulosic fibres and 50% by weight of discontinuous fibres of polyethylene having a fibre length in the range 0.8 to 2.0 mm. The superimposed sheets were laminated together by passing them through the nip formed by two light pressure rollers and, after passing the laminate over heated rollers maintained at about 120° C., was batched as a continuous roll.

Subsequently the laminate was heated to a tempeature of about 140° C. at which temperature the fibres in the sheets were rendered plastic and they fused together to form a three dimensional network in each sheet. The still hot laminate was embossed using a relatively cold embossing roller technique.

The product so formed was then rolled up in the manner of a conventional wallcovering.

A hanging trial was then carried out. The working surface of the product was pasted with an adhesive sold by Polycell Holding Limited under the Registered Trade Mark "Heavy Duty Polycell" using a brush. The pasted working surface of the laminate was offered up to the wall, smoothed into place and cut neatly at the top and bottom of the wall. This was repeated until the wall was covered by the laminate.

An inspection of the decorated wall showed that the deep embossed design in the laminate had not been lost while the laminate was being hung.

Subsequently, when it was decided to redecorate the wall, it was found that the wallcovering could be removed from the wall in large pieces without requiring to be soaked in water.

We claim:

1. A method of producing a wall- or ceiling- covering comprising the steps of laminating a first printable embossable ply consisting of a paper sheet containing from 60 to 100% by weight of cellulose wood pulp fibres and from 0 to 40% by weight of discontinuous fibres of a synthetic thermoplastic polymeric material and another supporting ply comprising a sheet containing from 10 to 60% by weight of cellulosic wood pulp fibres and from 40 to 90% by weight of discontinuous fibres of the same or different synthetic thermoplastic polymeric material, heating the laminate to a temperature at which the thermoplastic fibres are rendered plastic and fuse together to form a three dimensional network, and either simultaneously or subsequently embossing the hot laminate.

2. A method as claimed in claim 1 in which the paper sheet contains from 85 to 95% by weight of cellulose fibres and from 5 to 15% of discontinuous fibres of the synthetic thermoplastic polymeric material.

* * * * *